No. 667,933. Patented Feb. 12, 1901.
E. A. EASTMAN.
MACHINE FOR SAWING LASTS.
(Application filed Apr. 16, 1900.)
(No Model.)
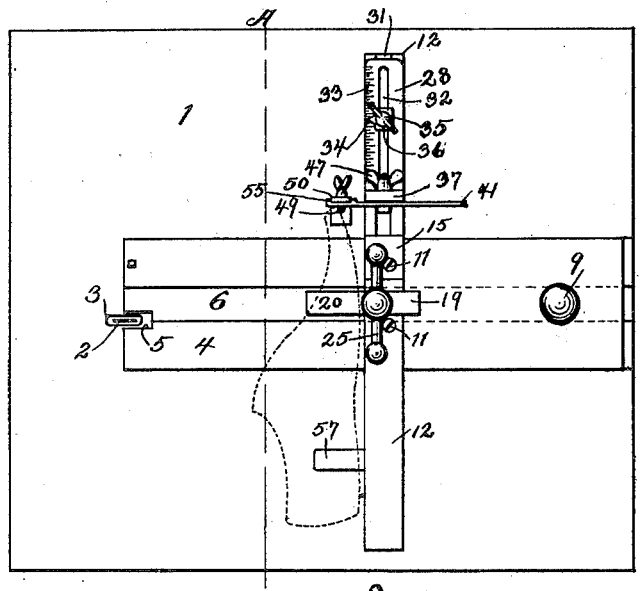
Fig. 1.
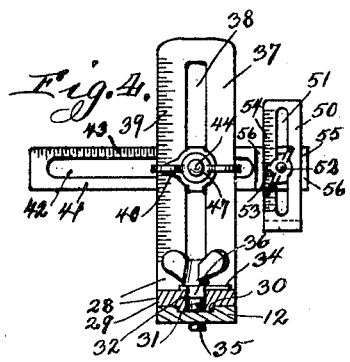
Fig. 4.
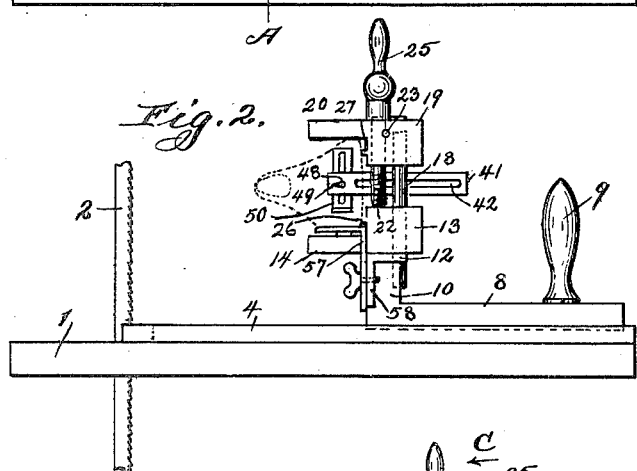
Fig. 2. Fig. 3.
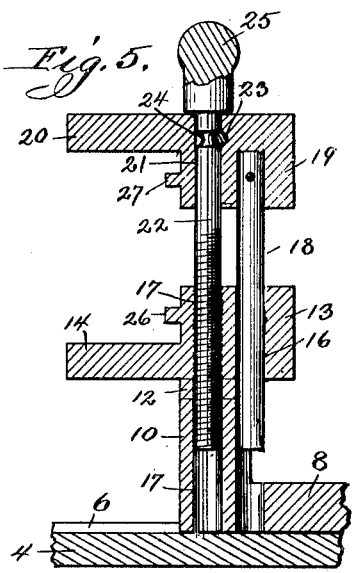
Fig. 5.
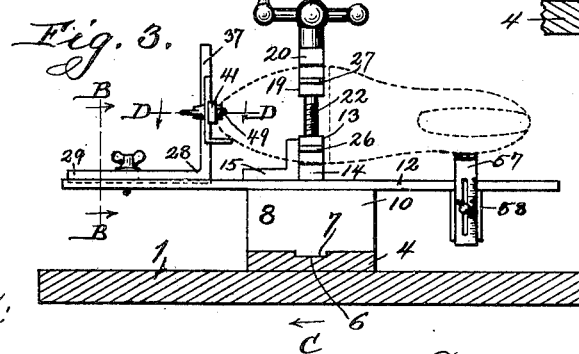
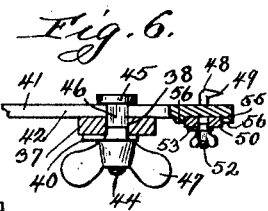
Fig. 6.
Witnesses:
W. J. Jacker.
L. E. Lerage.
Inventor:
Ernest A. Eastman
By Coburn, Stibben & McElroy
Atty's.
THE NORRIS PETERS CO., PHOTO-LITHO., WASHINGTON, D. C.

UNITED STATES PATENT OFFICE.

ERNEST A. EASTMAN, OF CHICAGO, ILLINOIS.

MACHINE FOR SAWING LASTS.

SPECIFICATION forming part of Letters Patent No. 667,933, dated February 12, 1901.

Application filed April 16, 1900. Serial No. 13,122. (No model.)

*To all whom it may concern:*

Be it known that I, ERNEST A. EASTMAN, a citizen of the United States, residing at Chicago, Cook county, Illinois, have invented certain new and useful Improvements in Machines for Sawing Lasts, of which the following is a specification.

In an application filed simultaneously herewith, Serial No. 13,121, I have described and claimed as a new article of manufacture a last made up of two separate pieces joined together by suitable means at a line running across the ball of the foot, the purpose of that invention being to permit the replacing of the worn-out or old-fashioned toe of a last by a new one of any desired style or the manufacture of a last from two smaller pieces than could be used for manufacturing it from one single piece. The place at which the old toe is cut off must be determined with the greatest accuracy and the new toe must be cut off from a partially-turned last with equal accuracy.

The object of the present invention is to produce a machine that shall be capable of cutting off such lasts and toes rapidly and with the utmost accuracy for all sizes of lasts.

Referring now to the accompanying sheet of drawings, in which the same reference characters are used to designate identical parts in all the views, Figure 1 is a plan view of the complete machine. Fig. 2 is a side elevation of the same. Fig. 3 is a vertical section on the line A A of Fig. 1. Fig. 4 is a vertical section, on a larger scale, on the line B B of Fig. 3. Fig. 5 is a vertical section, on a larger scale, on the line C C of Fig. 3; and Fig. 6 is a horizontal section on the line D D of Fig. 3.

The machine is mounted upon a suitable table 1, which is provided with a saw 2, preferably of the band variety, which passes through the aperture 3 in the table, this aperture preferably being located at the end of the stationary bed-plate 4, secured on the table and which has a notch 5 in its end registering with the aperture 3. This bed-plate 4 is provided with a channel 6, with which the elongated rib 7 on the under side of the sliding frame 8 coöperates, the channel 6 extending the entire length of the bed-plate 4, while the rib 7 likewise extends the entire length of the frame 8. As the rib 7 fits snugly in the channel 6, it will be apparent that the frame 8 by shoving on the handle 9 will be advanced in a straight line upon the saw 2.

As will be seen from Fig. 2, the sliding frame is L-shaped in longitudinal cross-section, and the turned-up L portion 10 has secured thereon, as by the screws 11, the cross piece or bar 12. This bar 12 has centrally mounted upon it the stationary block 13, which has the jaw 14 rigidly secured thereto or formed integral therewith. This block 13 is conveniently secured to the bar 12 by the angle-piece 15, which has its arms screwed or otherwise rigidly secured to the block and bar. Passing through the block 13, the bar 12, and the portion 10 of the frame 8 are the two apertures 16 and 17. The aperture 16 is of any desired shape to coöperate with the guide-rod 18, which is of corresponding shape in cross-section and projects downward from the moving block 19, which carries the upper jaw 20, coöperating with the jaw 14. This block 19 has journaled to rotate in the aperture 21 therein the screw-bolt 22, which rotates freely, as said aperture is not screw-threaded; but the bolt 22 is prevented from any longitudinal movement by the pin 23 in the block 19, which engages with the annular groove 24, formed in the bolt 22. The screw-threads on the bolt engage with the screw-threads formed in that portion of the aperture 17 which is screw-threaded, which portion may be formed in the L portion 10 of the base or in the bar 12, but which I have shown as preferably formed in the block 13. From the structure described it will be apparent that as the screw-bolt 22 is rotated by its handle 25 the jaw 20 will be brought to or from the jaw 14, so as to clamp a last between them, as indicated by the dotted lines in the figures. Projecting from the faces of the blocks 13 and 19, respectively, are the gage-stops 26 and 27, which furnish two fixed points relative to the jaws for the bottom of the last to rest against.

Before sawing the toe off of the old last or sawing the butt off of the new toe by means of a sole-pattern I locate and punch a hole at the same point in the bottom of both toes relative to the line upon which the cut is to be made. To accurately support the toes at this point in order to insure the cut being at right angles to the length of the last, I employ the gage mechanism to be now described. Slidingly mounted upon one of the ends of the bar 12 is the angle-piece or bracket 28, the horizontal arm 29 of which has the rib 30 on the under side thereof coöperating with the channel or groove 31, formed on the upper side of the bar 12, so as to always keep the bracket 28 parallel to the bar 12. The horizontal arm 29 is longitudinally slotted, as at 32, and has one edge graduated, as at 33, the graduation coöperating with the pointer 34, which is conveniently secured in place upon the set-screw 35, passing through the slot 32 and taking into a screw-threaded aperture in the arm 12. To prevent the index 34 turning, it is conveniently provided with a lug 36, projecting downward at each end thereof into the groove 32. It will of course be understood that instead of employing a set-screw I might employ a screw-threaded bolt secured to the arm 12 and projecting upward through the slot 32 and secure the parts in place by a wing-nut upon said bolt. A vertical arm 37 is also longitudinally slotted, as at 38, and may have its edge, as at 39, provided with graduations coöperating with an index-finger 40, similar to the index-finger 34, the index and graduation being employed to locate the vertical position of the cross-bar 41, which is longitudinally slotted, as at 42, and may have the scale or graduations thereon, as at 43, to determine its position relative to the vertical arm 37 of the bracket 28. The cross-bar 41 is secured in position and prevented from turning by the screw-bolt 44, having the head 45, and the adjacent squared portion 46, which projects through the slot 42 and partly through the slot 38, so that when the wing-nut 47 is screwed down upon the index-finger 40 the cross-bar 41 will be securely clamped in any desired adjustment, horizontally or vertically, relative to the vertical arm 37. The inner end of the bar 41 has rigidly secured thereto the stud 48, which has the point 49 projecting outwardly, as clearly shown in Figs. 1, 2, 3, and 6. It will be understood that this bar 41, and consequently the stud 48, will be adjusted to the necessary position for the particular size and style of last to be operated on, the horizontal adjustment being necessary to accommodate the different amounts of spring that are in the different lasts and the vertical adjustment being necessary to accommodate the differences in the shapes of the toes. When the last is in position, the point 49 of the stud 48 is inserted in the hole previously mentioned as being punched in the toe of the last, and the jaws being brought together upon the last, as shown in Figs. 1 to 3, the last will be securely held in proper position, so that as the sliding frame is shoved forward upon the saw the toe will be severed on exactly the proper plane.

To assist in supporting the toe of the last, I may employ the L-shaped support 50, which has its vertical arm provided with the elongated slot, as at 51, through which a stud 52, secured on the end of the cross-bar 41, projects, this screw-threaded stud 52 having thereon the index 53, similar to the indexes 34 and 40, and coöperating with the graduation 54, formed upon the edge of the vertical arm. The cross-bar 41 is provided with a vertical channel, as at 55, to accommodate the support 50, and this channel may either be cut bodily in the cross-bar or formed, as shown, by ribs 56, projecting from the rear surface of the bar. By adjusting this L-shaped support 50 to the proper point for the particular style of toe employed it will be seen that the toe can also be supported by the horizontal portion of the support.

I may also employ for use in connection with cutting off the entire last the inversely-L-shaped support 57, which is constructed like the angle-piece or bracket 28 and which is mounted upon an arm 58, projecting downward from the edge of the cross-piece 12, and is provided with graduations, as shown, to aid the ready adjustment for different sizes of lasts.

The operation of the device will be readily apparent. The old last and the new toe-piece having been marked at the toe, as stated above, and the various gages and supports having been adjusted for the size and style of last to be operated upon, the last is inserted in the holder in the position shown in dotted lines, with the point 49 of the stud 48 taking into the hole in the bottom of the toe and with the bottom of the last taking squarely against the surfaces 26 and 27, after which the handle 25 is turned until the jaws securely clasp the last, after which the sliding frame is moved forward by the handle 9 until the last is brought in contact with the saw 2, which cuts the toe squarely off in the plane desired. The old toe is now removed from the frame and the new one similarly positioned and the butt thereof cut off in the same manner. After all the lasts of the particular size and style have been sawed the various gages are adjusted for the next size and style to be operated upon, after which the operation is repeated.

While I have shown my invention as embodied in the form which I at present consider best adapted to carry out its purposes, it will be understood that it is capable of modifications and that I do not desire to be limited in the interpretation of the following claims, except as may be necessitated by the state of the art.

What I claim as new, and desire to secure by Letters Patent of the United States, is—

1. In a machine for the purpose described, the combination with the bed-plate and the saw operating adjacent thereto, of the frame movable upon said bed-plate and carrying the adjustable support for a last comprising the jaws movable toward and from each other to hold the body of the last, the bearing-surfaces 26 and 27 secured to and moving with the jaws and the gage to locate the position of the toe.

2. In a machine for the purpose described, the combination with the bed-plate, and the saw operating adjacent thereto, of the frame movable upon said bed-plate, and adjustable supports mounted on said frame comprising the jaws adapted to hold the body of the last and having the bearing-surfaces 26 and 27 coöperating with the bottom portion of the last, and the gage for locating the position of the toe.

3. In a machine for the purpose described, the combination with the bed-plate and the saw operating adjacent thereto, of the frame movable upon said bed-plate, and the adjustable supports for a last mounted on said frame and comprising the jaws to hold the body of the last and the gage to locate the position of the toe consisting of the point and means for adjusting it to any necessary position.

4. In a machine for the purpose described, the combination with the bed-plate, and the saw operating adjacent thereto, of the frame movable upon said bed-plate, and the adjustable supports for a last on said frame comprising the jaws to hold the body of the last and the gage for the toe provided with means for adjusting it vertically, transversely or horizontally, as may be required to adapt it for different styles and sizes of lasts.

5. In a machine for the purpose described, the combination with the bed-plate, and the saw operating adjacent thereto, of the frame movable upon said bed-plate, and the adjustable supports for a last on said frame comprising the jaws to hold the body of the last and the gage for the toe provided with means for adjusting it consisting of the horizontal bar having the slotted angle-piece adjustable thereon, and the cross-bar carrying said gage and adjustable vertically and horizontally upon the vertical portion of the angle-piece.

6. In a machine for the purpose described, the combination with the bed-plate, and the saw operating adjacent thereto, of the frame movable upon said bed-plate, and the adjustable supports for a last mounted on said frame and comprising the jaws to hold the body of the last and the gage for the toe mounted upon the horizontal longitudinally-slotted bar 41 coöperating with the vertically-slotted portion of the angle-piece 28 and secured thereon by means of the squared bolt 44 and the wing-nut 47, said angle-piece 28 having its horizontal arm adjustably secured upon the horizontal bar 12 on the frame.

7. In a machine for the purpose described, the combination with the bed-plate, and the saw operating adjacent thereto, of the frame movable upon said bed-plate, and the holding mechanism on said frame consisting of means for supporting the body portion of the last, and a gage-point coöperating with the toe and adjustable vertically, transversely or horizontally to any necessary position.

8. In a machine for the purpose described, the combination with the bed-plate, and the saw operating adjacent thereto, of the frame movable upon said bed-plate, and the holding mechanism on said frame consisting of means for supporting the body portion of the last, a gage-point coöperating with the toe and adjustable to any necessary position, and a vertically-adjustable toe-support mounted adjacent to said gage-point.

9. In a machine for the purpose described, the combination with the bed-plate, and the saw operating adjacent thereto, of the frame movable upon said bed-plate, and the holding mechanism on said frame consisting of means for supporting the body portion of the last, a gage-point coöperating with the toe and adjustable to any necessary position, and a vertically-adjustable heel-support located upon the frame on the opposite side to the gage-point.

10. In a machine for the purpose described, the combination with the bed-plate, and the saw operating adjacent thereto, of the frame movable upon said bed-plate, and the holding mechanism on said frame consisting of means for supporting the body portion of the last, a gage-point coöperating with the toe and adjustable to any desired position, a vertically-adjustable toe-support mounted adjacent to said gage-point, and a vertically-adjustable heel-support oppositely mounted to said toe-support.

11. In a machine for the purpose described, the combination with the bed-plate, and the saw operating adjacent thereto, of the frame movable upon said bed-plate, and the holding mechanism on said frame consisting of means for supporting the body portion of the last, a gage-point coöperating with the toe and adjustable to any necessary position, and a toe-support mounted adjacent to said gage-point and consisting of an L-shaped piece provided with means for adjusting it vertically.

12. In a machine for the purpose described, the combination with the bed-plate, of the frame movable upon said bed-plate, the fixed jaw mounted thereon, the movable jaw, the bearing-surfaces 26 and 27 secured to said fixed and movable jaws respectively, the guide-strip coöperating with said jaws, and the screw-bolt rotating in one jaw but held from longitudinal movement therein, and having its screw-threaded end engaging with the screw-threads in the other jaw, substantially as and for the purpose described.

ERNEST A. EASTMAN.

Witnesses:
HATTIE O. HALVORSON,
LOUISE E. SERAGE.